(12) United States Patent
Nirmel

(10) Patent No.: US 9,392,744 B2
(45) Date of Patent: Jul. 19, 2016

(54) FORK HAVING TINE WITH RETAINING FEATURE

(76) Inventor: Chittaranjan N. Nirmel, Warfordsburg, PA (US)

( * ) Notice: Subject to any disclaimer, the term of this patent is extended or adjusted under 35 U.S.C. 154(b) by 1112 days.

(21) Appl. No.: 13/068,316

(22) Filed: May 9, 2011

(65) Prior Publication Data
US 2012/0288351 A1 Nov. 15, 2012

(51) Int. Cl.
| A47G 21/02 | (2006.01) |
| A01D 9/00 | (2006.01) |
| A01D 9/06 | (2006.01) |
| B66F 9/12 | (2006.01) |
| B66F 9/18 | (2006.01) |
| A47J 43/28 | (2006.01) |
| A01D 9/02 | (2006.01) |

(52) U.S. Cl.
CPC .. *A01D 9/00* (2013.01); *A01D 9/02* (2013.01); *A01D 9/06* (2013.01); *A47G 21/023* (2013.01); *A47J 43/283* (2013.01); *B66F 9/12* (2013.01); *B66F 9/18* (2013.01)

(58) Field of Classification Search
CPC ............. A01D 9/00; A01D 9/02; A01D 9/04; A01D 9/06; A47G 21/02; A47G 21/023; A47G 21/026; A47G 2400/067; B66F 9/12; B66F 9/18; A47J 43/283
USPC ........... 30/147, 148, 150, 322, 323, 129, 137; D7/643, 653; 294/55.5
IPC ....... A01D 9/00, 9/02, 9/04, 9/06; A47G 21/02, A47G 21/023, 21/026; B66F 9/12
See application file for complete search history.

(56) References Cited

U.S. PATENT DOCUMENTS

| 130,923 | A | * | 8/1872 | Laurence | 30/137 |
| 747,986 | A | * | 12/1903 | Layne | 294/55.5 |
| 1,747,039 | A | * | 2/1930 | Wyly, Jr. | 30/129 |
| 1,751,853 | A | * | 3/1930 | Buck | 241/168 |
| 2,322,503 | A | * | 6/1943 | Bowman | 30/148 |
| 2,637,104 | A | * | 5/1953 | Samson | 30/322 |
| 3,552,017 | A | * | 1/1971 | Smuts | 30/322 |
| 3,609,865 | A | * | 10/1971 | Golden | 30/322 |
| 4,326,743 | A | * | 4/1982 | Tamura | 294/55.5 |
| 4,338,721 | A | * | 7/1982 | Cauchon et al. | 30/322 |
| D272,033 | S | * | 1/1984 | Saucier | D7/653 |
| 5,542,181 | A | * | 8/1996 | Gaylord | 30/148 |
| D387,953 | S | * | 12/1997 | Town et al. | D7/643 |
| 6,105,259 | A | * | 8/2000 | Meyers et al. | 30/323 |
| D621,232 | S | * | 8/2010 | Lion et al. | D7/653 |
| 2006/0027064 | A1 | * | 2/2006 | Panik et al. | 83/13 |
| 2009/0229130 | A1 | * | 9/2009 | Swierski et al. | 30/123 |
| 2010/0352896 | | * | 12/2010 | Hebebrand. | 30/150 |

FOREIGN PATENT DOCUMENTS

DE 34 40 445 * 5/1986 ........... A47G 21/023

* cited by examiner

*Primary Examiner* — Clark F Dexter

(57) ABSTRACT

Conventional multi-tined implements such as cutlery and serving forks, pitchforks and front-end loader machine forks, all have smooth tine surfaces from which the respective items being picked up and transferred by a user may unintentionally slip off and cause harm. All such implements are provided enhanced ability to retain their respective loads during their intentional transfer by a user by the provision of a plurality of topographic discontinuities on selected load-contacting surfaces of their tines. These topographic discontinuities include small barb-like elements generated by wedge-shaped recesses extending into the tines and/or by barb-like projections extending from the tines into inter-tine gaps between adjacent tines. On thus improved food-handling implements all intersections, corners, edges and points incidental to formation of any topographic discontinuities are smoothed out to prevent physical harm to users.

9 Claims, 6 Drawing Sheets

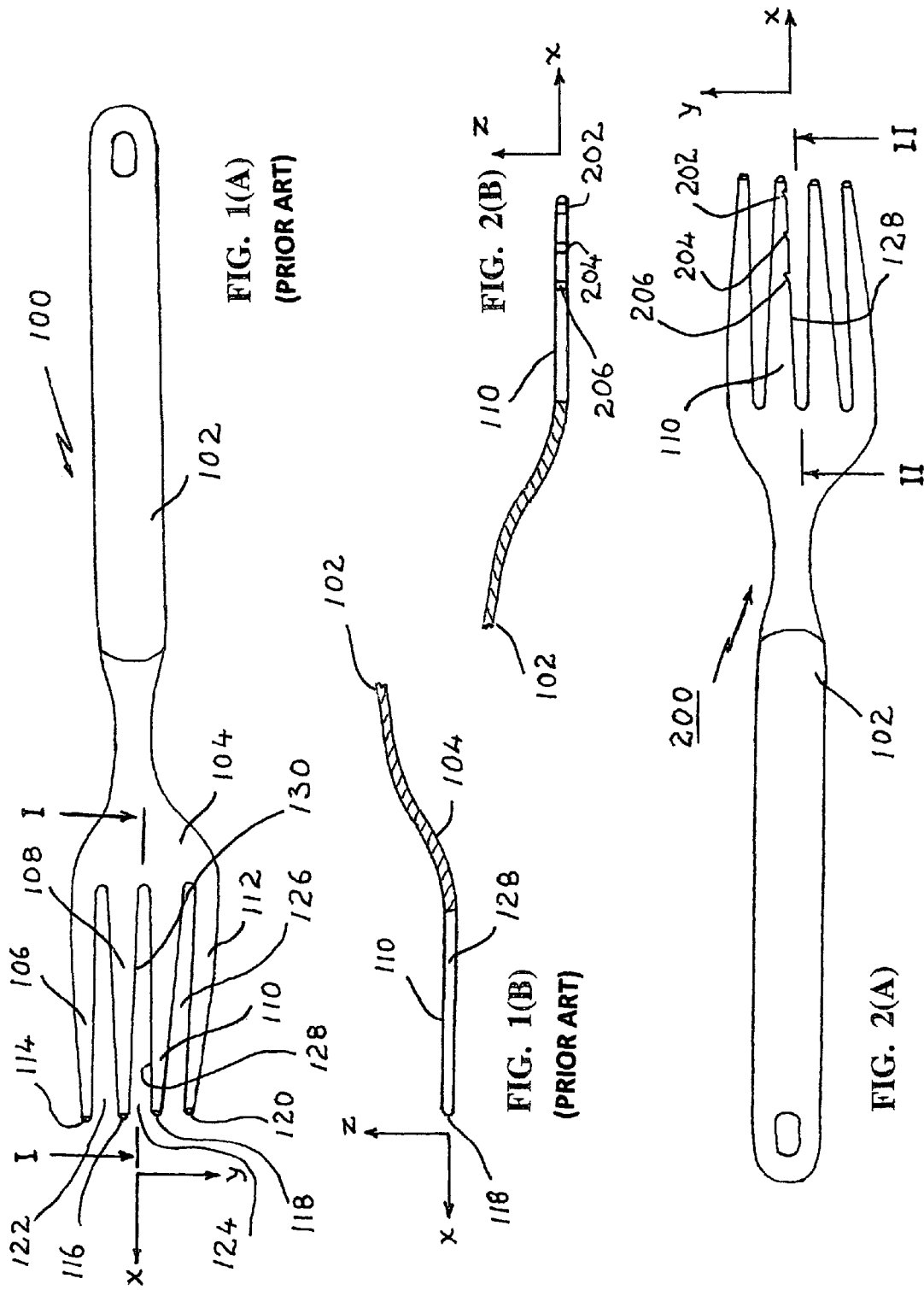

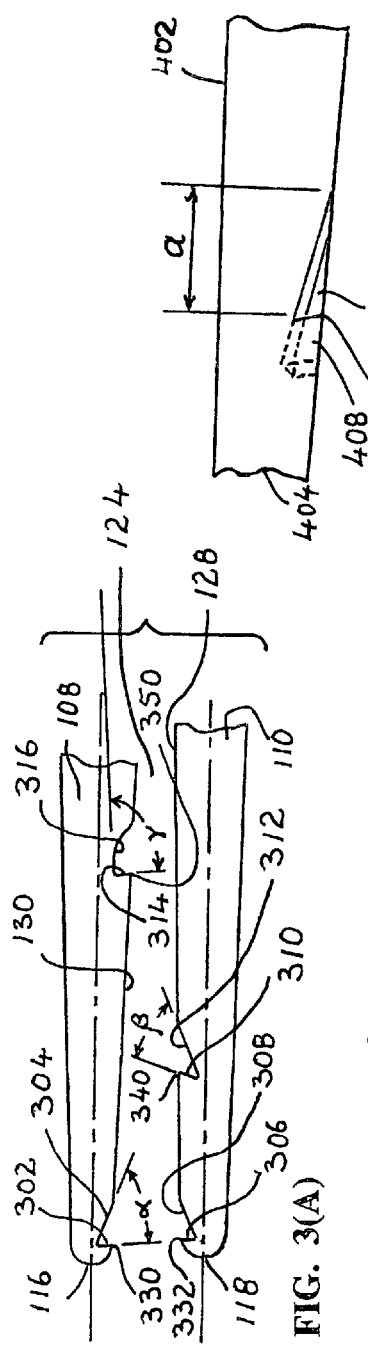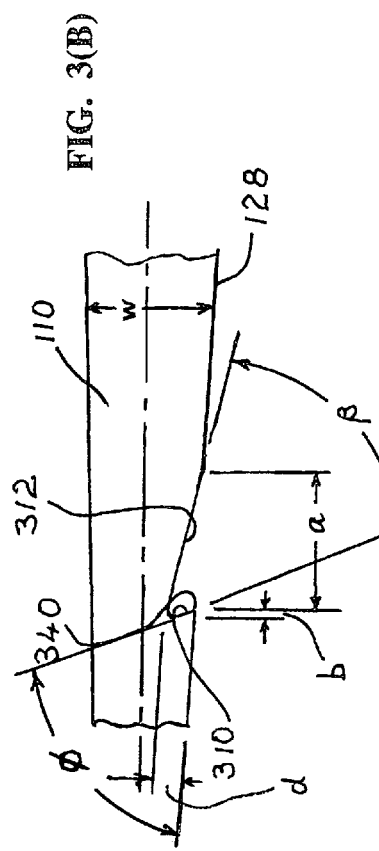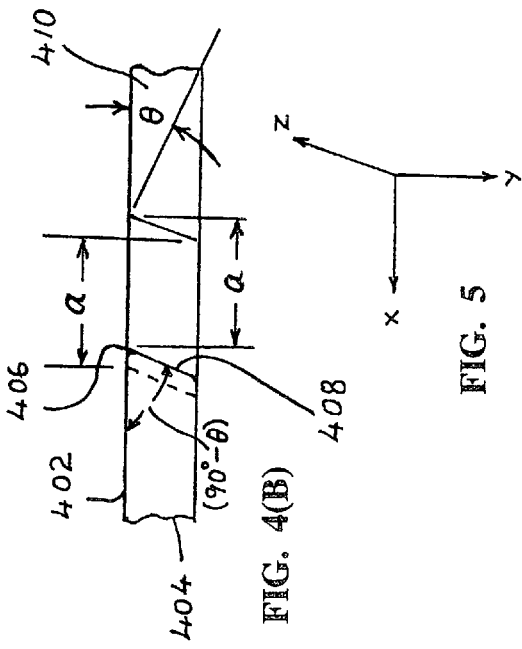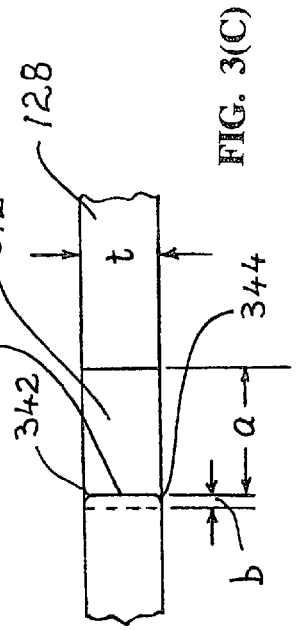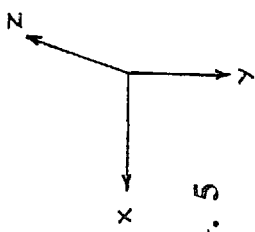
FIG. 3(A)
FIG. 3(B)
FIG. 3(C)
FIG. 4(A)
FIG. 4(B)
FIG. 5

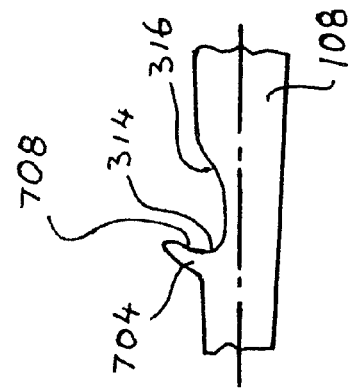
FIG. 11(A)
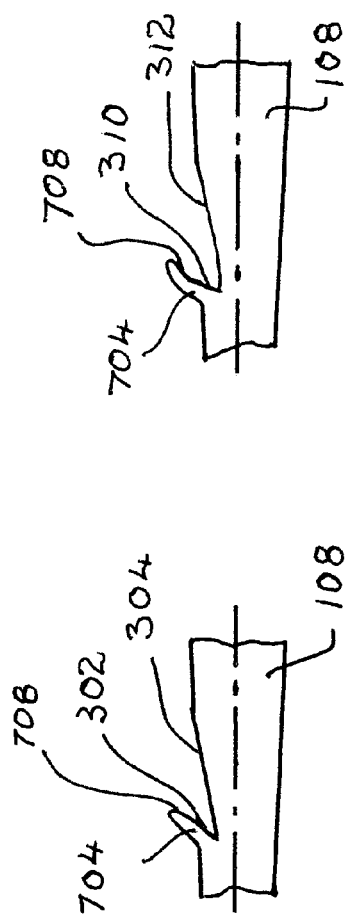
FIG. 11(C)
FIG. 11(E)
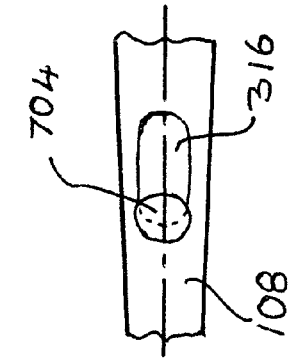
FIG. 11(B)
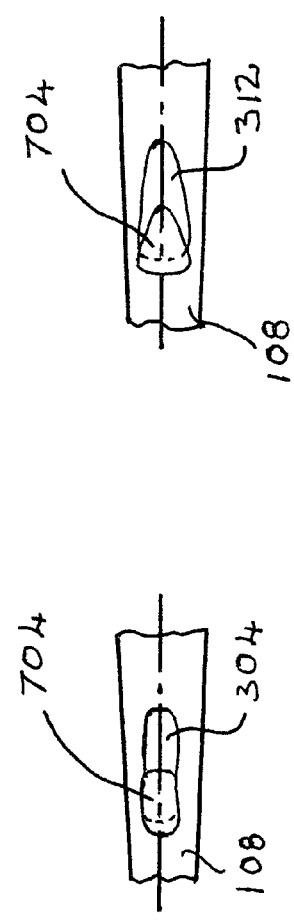
FIG. 11(D)
FIG. 11(F)

FORK HAVING TINE WITH RETAINING FEATURE

FIELD OF THE INVENTION

This invention relates to improvements to a fork provided with multiple tines, that improve a user's ability to comfortably engage and carry with the fork items that otherwise might easily slide off the tines. More particularly, this invention relates to improvements to the tines of a cutlery fork that allow a user to easily engage with and securely retain to the fork items of food that are soft, small or slippery.

BACKGROUND OF THE INVENTION

There are many kinds of multi-tined forks in common use that are used to pick up and transfer a variety of things from one location to another. Such forks range in size from relatively small ones used by individuals for dining, larger ones used to manipulate and serve relatively heavy pieces of food, even larger ones for agricultural applications, and the largest for industrial operations.

Dining forks of the kind found in durable cutlery sets are typically made of metal, and can be quite expensive. Cheaper disposable dining forks, sometimes individually wrapped, are typically made of molded plastics materials. Both kinds have an ergonomically designed elongate handle attached to a head typically comprising three to five closely spaced, generally parallel, often mildly curved, smooth-surfaced, forwardly aligned, frequently tapered, tines that have somewhat rounded points at their distal ends.

A person using such a conventional dining fork usually pushes one or more of the tine points into food, e.g., a piece of meat, egg, fruit or vegetable, to physically engage it with one or more tines and then carry the food to his or her mouth to eat it. If the food is not adequately engaged with the tine(s) it may fall off during the transfer—resulting in discomfort to the diner and embarrassment all around. If the food being eaten with the fork is soft and slippery, e.g., cling peaches in heavy syrup or a piece of soft wet meat from a stew, the user may find it most convenient to scoop up and carry the food resting on top of the tines. But this might violate the dictates of etiquette, is not always easy for young children or the elderly to manage, and might still lead to the food being dropped on its way to the user's mouth. The same may happen to an adult trying to feed almost any kind of food to a young child or an invalid with a conventional dining fork.

There are disposable implements, which are sometimes called "sporks", that combine the structural attributes of a conventional fork and a conventional spoon in the form of three-dimensionally curved concave tines cut into the bowl to ease the task of engaging and carrying the food. However, because the typical spork is made of very smooth and slippery plastics material the problem at issue basically remains unsolved.

There is, therefore, a need for an improved dining fork that enables an adult with less than ideal dexterity, hand-eye coordination and steadiness—and even a child—to easily engage and securely carry with the improved fork small, soft or slippery elements of food to eat the same.

Larger multi-tined food-serving forks, of the type typically used to handle and serve cooked juicy meat being sliced off from a roasted pig, turkey, beef or the like, also pose the same challenge: ensuring that a piece of food being transferred by a user does not fall off the tines of the fork unintentionally. Such forks also can bear similar improvement to perform better.

Likewise, users of even larger tined forks—as are used in agriculture and industry—may encounter the same basic problem, i.e., the need to avoid unintended slippage of a load from a fork transferring the same. On occasion, multi-tined pitchforks are used to manually transfer wet and/or slippery materials like wet grass, rotting leaves, and the like on farms and in gardens. Similarly, larger multi-tined forks are used on loaders to lift and move around large and heavy bales of straw or hay that may have sat in the open for long periods of time and might therefore have decomposed, be wet, and are slippery. Other multi-tined implements are employed in meat-processing facilities to manipulate animal carcasses. Most such "forks" typically have a plurality of long, smoothly surfaced, diversely pointed, sometimes gently curved, metal tines disposed generally parallel to each other. It is important in using any of these forks to guard against problems and danger to personnel that could arise from unintended separation of the object or material from the fork during its use. A simple and inexpensive improvement to such forks to minimize the above-discussed foreseeable problems is therefore also highly desirable.

The present invention meets this need with a very simple and inexpensive solution that is considered highly adaptable for use a variety of applications.

SUMMARY OF THE INVENTION

It is a principal object of this invention to simply and inexpensively improve the structure of at least one tine of a multi-tined fork to resist unintended separation of at least that tine from an object into which that tine has been located by a user.

It is another principal object of this invention to simply and inexpensively improve the object-holding capability of a conventional multi-tined fork, by providing on at least one of the tines a user-friendly topographic discontinuity that enhances engagement of at least that tine, and hence the fork itself, with an object into which at least that tine has been located by a user.

Both these objects are realized by providing on a fork having a rear end and a head at a forward end, in which the head supports a plurality of spaced-apart and longitudinally aligned tines that have distal ends for insertion into an object to engage with and transfer the same, an improvement which comprises:

a topographic discontinuity, on a first tine, on a first side surface thereof which faces an opposing side surface of an adjacent second tine, wherein the discontinuity is shaped and disposed to permit easy insertion of the first tine into the object past the discontinuity and to thereafter resist unintentional withdrawal of the first tine from the object.

It is a related object of this invention to improve a conventional dining or serving fork to enhance its capability to transfer soft or slippery food as intended by a user.

This object is realized by providing on a dining fork having a handle at a rear end and a head at a forward end, in which the head supports a plurality of spaced-apart and longitudinally-aligned tines that have distal ends shaped for insertion into an item of food to engage with and transfer the same, an improvement which comprises:

a topographic discontinuity provided to a first tine, on a first side surface thereof which faces an opposing side surface of an adjacent second tine, wherein the discontinuity extends into the first side surface to a predetermined depth, and comprises a generally wedge-shaped recess, wherein the wedge shape is defined by a first surface intersecting a second surface at a wedge angle not larger than 90 degrees, wherein the first surface intersects the first side surface at a first location close to the distal end of the first tine, and wherein all intersections, corners, edges and points in the resulting structure are smoothly rounded.

It is an even further object to provide at least one tine, in a multi-tined fork arrangement, which positively engages with an item being physically transferred by the fork to thereby minimize the likelihood of unintended separation of the item from the fork during the transfer.

BRIEF DESCRIPTION OF THE DRAWING

FIG. 1(A) is a top plan view of a conventional metal dining fork with four flat tines; and FIG. 1(B) is a partial cross-sectional view, at Section I-I, of the head portion of the same.

FIG. 2(A) is a plan view of the conventional fork of FIGS. 1(A) and 1(B), showing improvements according to the first embodiment of this invention; and FIG. 2(B) is a partial cross-sectional view, at Section II-II, of the head portion of the same, showing improvements according to the first embodiment of this invention.

FIG. 3(A) is an enlarged partial top plan view of two of the tines of the conventional dining fork of FIGS. 1(A) and 1(B), showing improvements according to the first, second and third embodiments of this invention; FIG. 3(B) is a further enlarged partial top plan view of a single tine of the same dining fork, showing improvements according to the second embodiment of this invention; and FIG. 3(C) is an enlarged partial side view of the single tine of FIG. 3(B), showing improvements according to the second embodiment of this invention.

FIG. 4(A) is an enlarged partial top plan view of a single tine of the conventional dining fork of FIGS. 1(A) and 1(B), showing improvements according to the fourth embodiment of this invention; and FIG. 4(B) is an enlarged partial side view of the same, showing improvements according to the fourth embodiment of this invention.

FIG. 5 is a unit vector diagram, indicating three mutually orthogonal Cartesian coordinate axes referenced for ease of description of details shown in the other figures.

FIGS. 11(A) and 11(B), respectively, are side and top partial views of a tine into which is formed a topographic discontinuity that is a combination of a recess per the first embodiment in combination with a projection extending towards an adjacent tine;

FIGS. 11(C) and 11(D), respectively, are side and top partial views of a tine into which is formed a topographic discontinuity that is a combination of a recess per the second embodiment in combination with a projection extending towards an adjacent tine; and FIGS. 11(E) and 11(F), respectively, are side and top partial views of a tine into which is formed a topographic discontinuity that is a combination of a recess per the third embodiment in combination with a projection extending towards an adjacent tine.

DETAILED DESCRIPTION OF THE PREFERRED EMBODIMENTS

Figure 6A:
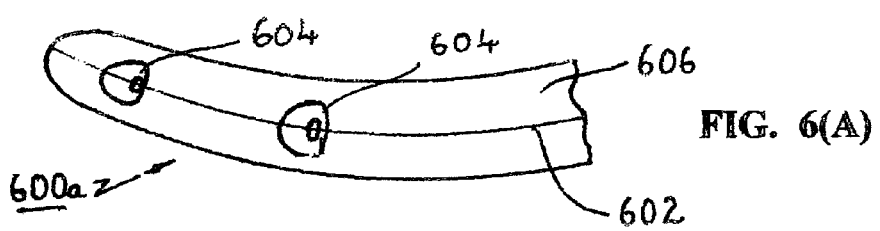
FIG. 6(A) is a side view of a distal portion of a curved tine of a typical disposable conventional dining fork, showing improvements according to the fifth embodiment of this invention.

As best seen in FIG. 1(A), a typical durable dining fork 100, of the kind found in conventional cutlery sets, has an elongate, ergonomically designed handle 102 at a rear end and a multi-tined head 104 at the front end. Individual designs may differ in details, e.g., a dining fork with four tines 106, 108, 110, 112 is not uncommon; the handle may be surfaced with wood, ceramic or plastics material; and the tines may be flat or curved in the x-z plane (as referenced per FIG. 5) and may be tapered or parallel-sided, with the tips 114, 116, 118, 120 of the tines more or less rounded.

The specific fork shown in FIG. 1(A) has a largely flat straight handle 102 contiguous with a head 104, although these elements may be made separate and/or separable; and the outside tines 106 and 112 have their outermost sides somewhat curved, although other designs may have them straight. The tines themselves may be parallel-sided or essentially tapered as in the exemplary fork 100 per FIG. 1(A).

What is structurally most important for this invention is a modification and improvement of the topography of the available tine surfaces that define conventional inter-tine gaps such as gaps 122, 124 and 126, the goal being to enhance the retention to the fork of an item being transferred thereby.

FIG. 1(B), in partial cross-sectional view in the x-z plane taken at Section I-I in FIG. 1(A), shows one such gap-defining surface 128 of conventional tine 110, the gap 124 being defined between it and opposing gap-defining surface 130 of the adjacent/opposing tine 108.

FIG. 2(A) shows in top plan view (in the x-y plane) certain topographic discontinuities 202, 204, 206 provided to a conventional dining fork 100, in a side surface 128 of a tine 110 thereof, each of which individually serves to produce an improved dining fork 200 according to this invention. FIG. 2(B), in partial cross-sectional view (in the x-z plane) taken at Section II-II in FIG. 2(A), shows a side view of the same topographic discontinuities 202, 204, 206 in improved gap-defining tine surface 128. These discontinuities respectively interrupt the otherwise smooth side surface 128, and each discontinuity has the shape of a barb-defining, generally wedge-shaped, recess extending into the body of tine 110.

An alternative form of such a topographic discontinuity comprises an outwardly projecting and generally barb-like extension formed on the surface of a conventional smooth-surfaced tine. Yet another alternative form for such a topographic discontinuity comprises both a recess into a gap-defining surface of a tine and, surfacewise contiguous therewith, a generally barb-like extension projecting into the inter-tine gap. The structural and functional details of various preferred embodiments of such topographical discontinuities, as considered best suited to serve particular applications, are individually described below.

FIG. 3(A) is an enlarged top plan view of two adjacent tines, e.g., 108 and 110 in the conventional dining fork 100, as improved by the provision of three different kinds of topographic discontinuities per three different embodiments of this invention.

In the first embodiment per FIG. 3(A), essentially flat intersecting surfaces 302, 304 subtend an angle "α" very close to the tip 116 at the distal end of tine 108. The intersection of surface 302 and the gap-defining tine surface 130 creates an edge of a barb 330 very close to tip 116. Note that in this embodiment barb 330 does not extend out of the tine 108 into gap 124. Note also that, to minimize the likelihood of food residue being trapped at the peak of angle "α", during and after washing of the dining fork for subsequent reuse, this peak is smoothly rounded. This is best seen in FIG. 3(B).

The tip of a tine in a conventional dining fork is quite small, and with care it can be easily inserted into a small item of food, e.g., a single pea or single kernel of boiled corn. Having surface 302 very close to tip 116 ensures that when tip 116 with corresponding barb 330 is inserted into such a small item of food the food will become more strongly attached to tine 108 than it would be without the barb 330. This happens because all food has a certain amount of resiliency and elasticity, and once tip 116 penetrates into the item of food the latter naturally will resiliently press onto the tine and become somewhat hooked to it. If the food is slippery, e.g., a single pea covered in gravy, some of which may be inserted into the pea by the penetrating tip 116, the food might easily slide off the conventional smooth-sided tine without the barb. Note also that with tapered gap 124 narrowing as the tine-pierced food item advances inward along the paired tines 108, 110 in the gap 124 between them, the food will be squeezed a little. This too will tend to force the food into better engagement with barb 330.

While improved gripping of food with one barb 330 is beneficial, provision of a comparable cooperating second barb 332, located directly opposite to it on adjacent tine 110 as shown in FIG. 3(A), is likely to be even more helpful in forking and engaging heavier items of slippery food, e.g., cling peach pieces soaked in heavy syrup, a butter-loaded piece of pancake, a soft piece of well-cooked meat in a stew, or the like. If the food item includes inherent fibers, e.g., cooked meat, candied yams, canned pineapple or the like, the hold by barbs such as 330 and 332 on it (alone or in cooperation) is likely to be even more effective because such fibers will be positively engaged by the barbs. As best seen in FIG. 3(A), surfaces 130 and 302 intersect approximately at a right angle. This angle is the maximum one wants for the capturing action of resulting barb 330 to be effective.

FIG. 3(A) also shows a second embodiment in the form of two intersecting surfaces 310 and 312 which intersect at an angle "β". Surfaces 310 and 128 intersect to form a barb 340 that subtends an acute angle at tine surface 128. This makes for a sharper barb than in the first embodiment, and may be more suitable for particularly slippery and less-fibrous foods.

FIG. 3(A) also shows a third embodiment, in which the topographic discontinuity is defined by the intersection of surfaces 314 and 316 with each other subtending an angle "γ". Surface 314 intersects with the gap-defining surface of tine 108 to form barb 350 which has a sharpness intermediate that of barbs 330 and 340. The key distinction here is that the entire surface 316 is not a single plane, like surfaces 304 and 312, but has a curved end portion smoothly blending into tine surface 130. This creates a larger food capture volume behind barb 350 than was available behind otherwise comparably sized barbs 330 and 340. Such a feature may be more suitable for somewhat crumbly foods such as relatively heavy chunks of slippery food, e.g., ketchup-covered soft boiled sausage, sour cream-covered baked potato, or the like.

Preferred values for angles "α", "β", and "γ", as best seen in FIGS. 3(A) and 3(B), range between 45 to a little less than 90 degrees.

The maximum preferred depth "d" of any of the topographic discontinuities, for the first through third embodiments, should be not more than about one-half the local width "w" of the tine to avoid structurally weakening the tine there. Therefore, if more than one topographic discontinuity is formed along a particular gap-defining surface of a tapered tine, the preferred depth may vary with the local width of the tine.

As best seen in FIGS. 3(B) and 3(C), per the second embodiment (with the topographic discontinuity viewed from the other side when compared with FIG. 3(A)) the maximum food-capturing opening into the discontinuity per the second embodiment is "a" and the barb overhang is "b". For most conventional dining fork designs it may suffice to limit "a" to no more than double the local tine thickness "t", and to limit "b" to no more than about one third the local tine thickness.

In any of the first three embodiments described above, identical topographic discontinuities may be disposed directly opposite to each other on two adjacent tines or may be staggered longitudinally if desired as a matter of design choice. More than six such discontinuities in any one gap probably will not be necessary, although this too is considered a matter of design choice.

To ensure against cuts or abrasions to the soft tissues of a user, especially a child, the topographic discontinuity surfaces and particularly the edges and corners (for example, at 342, 344 as best seen in FIG. 3(C)) of each barb such as 330, 340 and 350, should be smoothly rounded off. Likewise, as mentioned earlier, the inside intersection of the wedge-defining surfaces should also be rounded to minimize food residue residing there despite washing of the dining fork. The indicated rounding should be effective with both machine and manual washing of the dining fork.

FIGS. 4(A) and 4(B) respectively show in top plan view and side view a fourth embodiment, in which the topographic discontinuity is a wedge-shaped recess 400 formed with an edge 408 inclined at an angle " " relative to the top surface 402 of a dining fork 404 into the gap-defining side of the tine. This provides a more specific point 406 at the top of the barb 408, subtending an angle (90-) degrees at the gap-defining surface 410. As noted earlier, all points, corners (inside and outside of the food-capturing space of the recess), and edges should be rounded off to the degree deemed necessary to avoid injury to a user and for ease of washing the fork for reuse. The preferred maximum depth "d" of recess 400 into tine 404, as with the previously discussed embodiments, preferably is not more than about one half the local width "w" of the tine. The preferred maximum food-capturing opening of recess 400 preferably has the same dimension as "a" in the second embodiment per FIG. 3(C).

FIG. 6(A) shows an improvement, in side view, to a distal end portion of the gap-defining surface of a single curved tine 600a of a type typically found on relatively inexpensive conventional molded plastics dining forks commonly provided at fast food eateries or at picnics. Providing such topographic discontinuities on only one side of any inter-tine gap constitutes the fifth embodiment of this invention. Note the sometimes noticeable mold seam at 602. Forming any topographic discontinuity into the width of a tine made of a relatively weak plastics material very likely would weaken it to an unacceptable degree. However, with conventional molding techniques, it should be very easy to form the topographic discontinuities in the form of small pyramidal barb-like projections 604, 604 on the gap-defining sides 606, 608 of tines 600a, 600b, respectively. The projections extend to a height "h" into the gap between adjacent tines 600a and 600b and it is preferred that this height not exceed about one-half the local gap width.

Figure 6B:
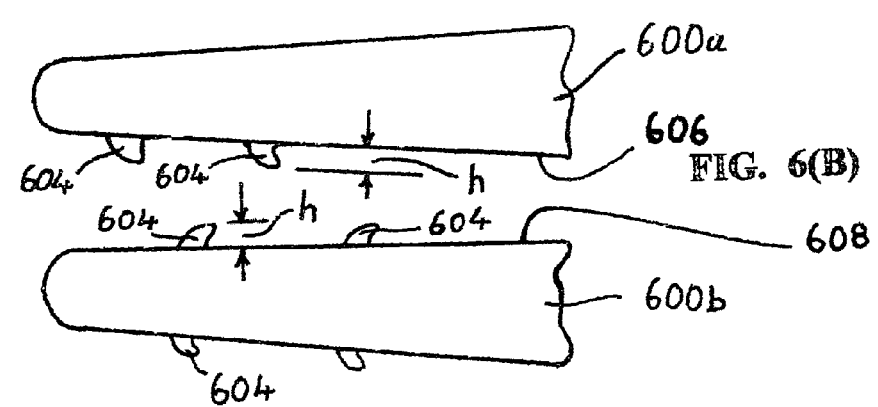
FIG. 6(B) is a plan view of the distal portion of two adjacent tines in the same disposable dining fork, showing improvements according to the sixth embodiment of this invention.

Such projections could be simple straight-sided conical pyramids or, as indicated in FIG. 6(B), have some backward curvature along their height for improved positive engagement with food.

Per the sixth embodiment of this invention, the projections could be distributed directly opposite to each other on at least two adjacent tines, or along the lengths of adjacent tines in alternation. The latter arrangement is best seen in FIG. 6(B). In any tine arrangement, all projections could be of the same or varying heights depending on considerations such as design preference, cost and convenience of manufacture from a particular plastics material, and other such practical considerations. Note that the projections 604 can have the form of pyramids of arbitrary cross-section, and they may also be inclined relative to the underlying gap-defining surface and away from the distal end of the supporting tine. This is generally indicated in FIG. 6(B).

Improved dining forks like those described above may be particularly beneficial in old folks' homes, child-care facilities, hospitals, rehabilitation centers, hospices, and other venues where the diners have compromised dexterity and so are not always in full control of their dining implements while eating. Furthermore, it is exactly in such places that the food being served to such health-handicapped users has a higher proportion of soft, wet and/or slippery items than is found in most regular meals eaten by healthy people. Provision of improved dining forks can only help these persons, both physically and psychologically.

Improvements in accordance with either the fifth or sixth embodiments may also be provided to so-called "sparks" as to improve their food-holding capabilities.

Figure 7A:
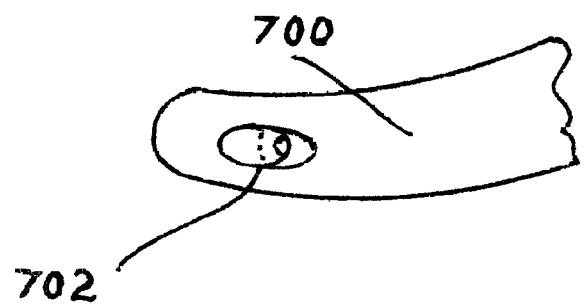
FIG. 7(A) is a side view of a distal end portion of a curved tine of a typical disposable conventional dining fork, showing improvements according to structure combining the third and the fifth embodiments of this invention.
Figure 7B:
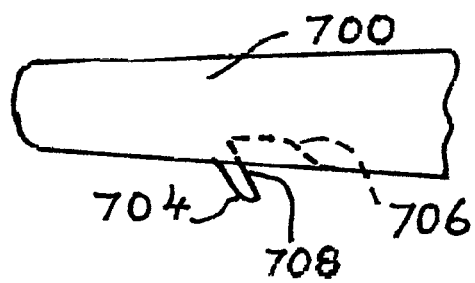
FIG. 7(B) is a partial plan view of the same improved tine.
Figure 7C:
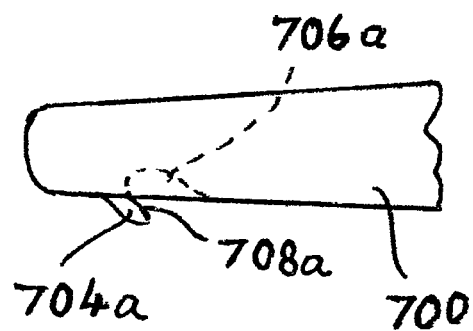

FIG. 7(A), in side elevation view, shows an end portion of a tine 700 of the kind typically found on disposable forks made of a plastics material. As best seen in the plan view in FIG. 7(B), it is provided with a topographic discontinuity 702 which combines a projection 704 extending from the tine 700 into an inter-tine region per the fifth embodiment (see FIG. 6(B)) and a recess 706 per the third embodiment (see FIG. 3(A)). The projection 704, as best seen in FIG. 7(B), has a rear surface 708 that is contiguous with and smoothly blends into the front surface of recess 706. This structure exemplifies how various aspects of the present invention may be combined advantageously for particular applications.

Figure 8:
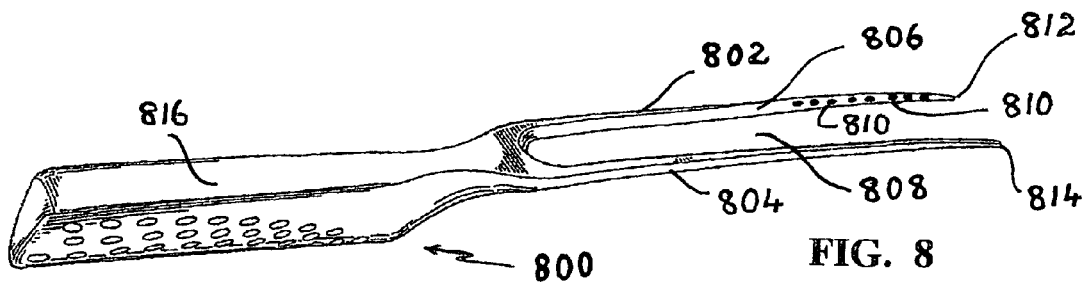
FIG. 8 is a perspective view of a conventional carving fork with two tines, showing improvements according to the seventh embodiment of this invention.

FIG. 8 shows, in perspective view, an improved conventional serving fork 800, according to the seventh embodiment of this invention. Such a serving fork typically has two generally parallel, cooperating tines 802, 804. Tine 802 has a gap-defining surface 806 and there is a similar opposing gap-defining surface on tine 804 (not visible or numbered in FIG. 8). The improvement here comprises the provision of a plurality of barb-like projections 810, formed on these opposed gap-defining surfaces. The projections preferably are geometrically similar to the backwardly curved projections 604 described with respect to the fifth and sixth embodiments above. Tines 802, 804 have respective relatively sharp points 812, 814 at their distal ends to facilitate forced insertion thereof into meat, e.g., a roast or a turkey, while and after it is being cooked. Projections 810 preferably are formed contiguous with or at least very firmly attached to the parent metal of tines 802 and 804 for strength and durability, and should be effective even if not more than about one fourth of an inch high.

During use of improved serving fork 800, the pointed ends 812, 814 of tines 802, 804 are forcibly inserted into the food item of interest to such an extent that at least one or more of barb-like projections 810 on each tine are located within the food item, e.g., roast meat, which then resiliently and positively engages its fibrous substance with the barbed projections. If the food item is ready to be served, the user then holds it steady with fork handle 816 gripped firmly in one hand and applies a carving knife with his or her other hand to cut off a desired piece of the meat. The improvements provided to the tines thereafter ensure against any unintended separation of the piece of meat being carried in engagement with the tines. The piece of meat can be pushed off the tines by a suitable force applied by the carving knife to disengage it from the barbed tines.

Figure 9:
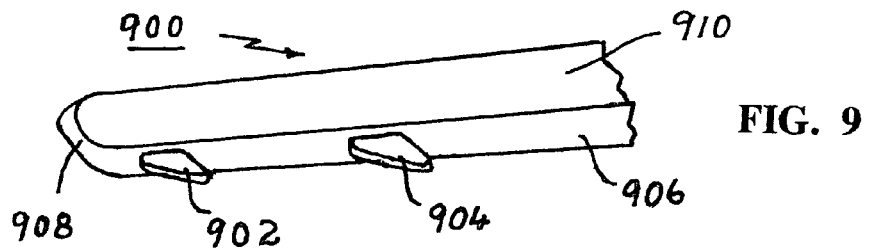
FIG. 9 is a perspective view of the distal portion of one tine of a multi-tined fork lift machine, showing improvements according to the eighth embodiment of this invention.

FIG. 9 shows in perspective view a single elongate strong tine 900 of the kind likely to be found on an industrial front-end loader machine that will have other parallel tines cooperating with tine 900. When such an arrangement of tines is forcibly inserted into a large heavy amount of a material that may be wet, slick or slippery, e.g., a large weather-exposed bale of fibrous straw or hay that is wet and may be somewhat decomposed, and is then lifted for transfer of the load to another location, there is a risk that the material being carried will slip off the conventional smooth tines. The improvement according to the eighth embodiment comprises the provision of a number of essentially triangular barb-like elements 902, 904 extending into the gap between adjacent tines defined partly by gap-defining surface 906 of tine 900. The result will be comparable to that explained earlier in relation to the sixth embodiment with reference to FIGS. 6(A), 6(B): the elements 902, 904 will positively engage with some of the fibrous material which largely rests on the tine's smooth top surface 910 but also sags into the gap between adjacent tines. Engagement of the material by the projections 902, 904 between the tines will reduce any tendency of the carried material to slip off the tines of the loader, as might otherwise happen if the loader is accelerated rapidly, travels up or down an incline, or has to change direction of travel abruptly. Tines 904, 906 need not be of the same size, and need not necessarily be provided on both sides of a gap or in a particular distribution.

Figure 10:
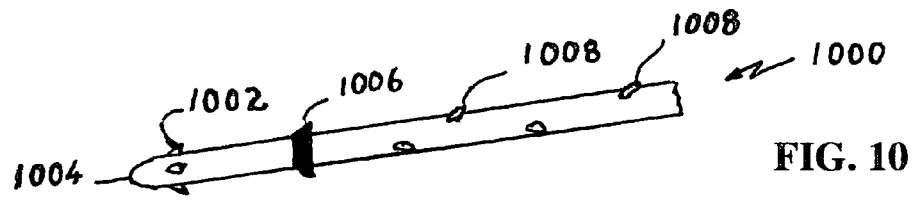
FIG. 10 is a perspective view of the distal end portion of a single tine of a multi-tined pitchfork, showing improvements according to the ninth, tenth and eleventh embodiments according to this invention.

Finally, FIG. 10 shows the ninth, tenth and eleventh embodiments in exemplary manner, as applied to one of a plurality of straight, cylindrical, pointed parallel tines of a pitchfork used to manually lift and carry wet, slick or slippery material in an agricultural setting.

The ninth embodiment comprises the provision of a plurality of short backwardly inclined barb-like elements 1002 to such a tine 1000 in a circumferentially symmetric array close to the pointed distal end 1004.

The tenth embodiment comprises the provision of a fully circumferential barb-like ring element 1006 having a cross-section that is very similar to the backward leaning triangular cross-sectional shape of barb-like elements 604. This, in effect, provides a fully circumferential, and therefore compactly effective, ring barb on what may be only a very small diameter tine.

The eleventh embodiment comprises the provision of a plurality of circumferentially and longitudinally distributed barb-like elements 1008 over a substantial portion of tine 1000.

The improved structure resulting from the inclusion of any one of the ninth, tenth or eleventh embodiments will increase the retention of wet heavy and/or slippery material on the pitchfork as a user employs it to carry the material. Depending on cost considerations, one might choose to have more than one of these improvement features on the same pitchfork. The heights of the added elements, i.e., 1002, 1006 or 1008, preferably do not exceed the diameter of the tine 1000 to which they are added to improve its utility.

Other obvious variations and combinations of the various features within the scope of this disclosure will no doubt occur to persons of ordinary skill in the related arts. All such modifications of this teaching, including but not limited to combinations of various individual aspects of the disclosed structures, are intended to be comprehended within the appended claims.

The invention claimed is:

1. In a dining fork that has a handle at a rear end and a head at a forward end, the head including a plurality of spaced-apart and longitudinally-aligned tines having respective distal ends shaped for insertion into an item of food to engage with and transfer the same, wherein the improvement comprises:
   a topographic discontinuity provided to a first one of said tines on a first side surface thereof, the first side surface facing an opposing side surface of an adjacent second one of said tines,
   wherein the discontinuity extends into the first side surface to a predetermined depth and comprises a recess extending between a first location and a second location, wherein the first location is closer to the distal end of the first tine than the second location,
   wherein the the recess has a shape defined by a first surface intersecting a second surface at a first angle smaller than 90 degrees,
   wherein the first surface intersects the first side surface at the first location at a second angle less than 90 degrees, and
   wherein the intersection of the first surface and the first side surface defines an edge that is inclined with respect to a line orthogonal to the longitudinal direction of the tine.

2. The dining fork according to claim 1, wherein the improvement further comprises:
   at least one additional topographic discontinuity on the first side surface, each additional topographic discontinuity being separated from the first topographic discontinuity by a respective separation distance.

3. The dining fork according to claim 1, wherein the improvement further comprises:
   a counterpart topographic discontinuity, provided on the opposing side surface of the adjacent tine and disposed directly opposite to the first topographic discontinuity.

4. The dining fork according to claim 1, wherein the improvement further comprises:
   a counterpart topographic discontinuity, provided on the opposing side surface of the adjacent tine and disposed to be other than directly opposite to any topographic discontinuity provided on the first tine.

5. In a fork having a rear end and a head at a forward end, the head including a plurality of spaced-apart, longitudinally-aligned tines having respective distal ends for insertion into an object to engage the same, wherein the improvement comprises:
   a first topographic discontinuity provided to a first tine on a first surface thereof which faces an opposing side surface of an adjacent second tine across an inter-tine gap, the first topographic discontinuity comprising both a recess extending into the first side surface to a predetermined depth and a projection adjoining the recess and extending into the inter-tine gap from the first side surface toward the second tine,
   wherein the projection tapers outwardly from the first side surface toward the adjacent second tine, and
   wherein the tapered projection inclines away from the distal end of the first tine.

6. The fork according to claim 5, wherein the improvement further comprises:
   at least one additional topographic discontinuity provided on the first side surface, each additional topographic discontinuity being separated from the first topographic discontinuity by a respective separation distance.

7. The fork according to claim 5, wherein the improvement further comprises:
   a counterpart topographic discontinuity, provided on the opposing side surface of the adjacent tine and disposed directly opposite to the first topographic discontinuity.

8. The fork according to claim 5, wherein the improvement further comprises:
   a counterpart topographic discontinuity, provided on the opposing side surface of the adjacent tine and disposed to be other than directly opposite to any topographic discontinuity provided on the first tine.

9. The improved fork according to claim 5, wherein:
   the recess and the projection have a smoothly contiguous shared surface.

* * * * *